(12) United States Patent
Courtney et al.

(10) Patent No.: US 8,397,274 B2
(45) Date of Patent: Mar. 12, 2013

(54) METHOD FOR AUTHENTICATING DEVICE CAPABILITIES TO A VERIFIED THIRD PARTY

(75) Inventors: Sean Alexander Courtney, Waterloo (CA); Eli Omen Jackson, Waterloo (CA); Alexander Truskovsky, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 236 days.

(21) Appl. No.: 12/835,007

(22) Filed: Jul. 13, 2010

(65) Prior Publication Data
US 2012/0017081 A1 Jan. 19, 2012

(51) Int. Cl.
*H04L 9/00* (2006.01)
(52) U.S. Cl. .......................................... 726/1; 713/176
(58) Field of Classification Search ................ 726/176, 726/1
See application file for complete search history.

(56) References Cited

U.S. PATENT DOCUMENTS

| | | |
|---|---|---|
| 2002/0026505 A1 | 2/2002 | Terry |
| 2012/0008534 A1* | 1/2012 | Lipford et al. ................ 370/310 |

FOREIGN PATENT DOCUMENTS

| | | |
|---|---|---|
| CA | 2746062 | 1/2012 |
| EP | 2407904 | 1/2012 |
| WO | WO 2006/114361 A1 | 11/2006 |

OTHER PUBLICATIONS

Extended European Search Report for Application No. 10169380.2-2212 (Jul. 9, 2010).
Schneider Bed "Applied Cryptography" Jan. 1, 1996, Applied Cryptography, protocols, algorithms, and source code in C (John Wiley & Sons, Inc., New York) pp. 35-37 ISBN: 978-0-471-11709-4.
Extended European Search Report. European Application No. 10169380.2. Dated: Sep. 7, 2010.
Schneier B Ed "Applied Cryptography" Jan. 1, 1996, Applied Cryptography, protocols, algorithms, and source code in C (John Wiley & Sons, Inc., New York) pp. 35-37 ISBN: 978-0-471-11709-4.
Schneier B Ed "Applied Cryptography" Jan. 1, 1996, Applied Cryptography, protocols, algorithms, and source code in C (John Wiley & Sons, Inc., New York) pp. 38-40 ISBN: 978-0-471-11709-4.
Exam Report. European Patent Application No. 10169380.2. Dated: Oct. 30, 2012.
Response. European Patent Application No. 10169380.2. Dated: Jul. 18, 2012.

\* cited by examiner

*Primary Examiner* — Matthew Smithers
(74) *Attorney, Agent, or Firm* — Bereskin & Parr LLP/S.E.N.C.R.L., s.r.l.

(57) ABSTRACT

A system, devices and methods for verifying an administrator computing device to a guest computing device, verifying the guest device to the administrator device and outputting a list of the guest device capabilities for the administrator device such that the guest device is capable of verifying the administrator device, for example to ensure it does not divulge its capabilities to imposters, and the administrator device is capable of identifying whether the list of device capabilities is authentic. Verification can be achieved through cryptographic hashes of private certificates, digital signatures or expected output from verified modules. The list of device capabilities may be restricted based on the authorization granted to the administrator computer and may be altered or watermarked for verification. A failure to verify the administrator device may restrict execution of instructions on the guest device to prevent unauthorized access to the guest device's capabilities.

30 Claims, 7 Drawing Sheets

METHOD FOR AUTHENTICATING DEVICE CAPABILITIES TO A VERIFIED THIRD PARTY

FIELD

The present disclosure generally relates to a system and method to identify the capabilities of a mobile electronic device.

BACKGROUND

As mobile electronic devices become more prolific and achieve greater and more diverse capabilities, it has become increasingly difficult to identify the capabilities of any given mobile electronic device. One consequence of this is that it is has become more difficult to identify whether a particular mobile electronic device may enter a government building, a military compound or any other restricted access area.

For non-limiting example, a security administrator at the entrance to a court room may be tasked with preventing all devices capable of recording images, audio or video from entering the court room. Powering on the device, visual inspection and asking the person carrying the device about the device are options the security administrator can employ. If the security administrator is unable to identify the device's capabilities, the security administrator may restrict the device from entering the court room. As the proliferation, diversity and capabilities of mobile electronic devices increase, it becomes more difficult to identify the capabilities of devices and to do so quickly.

BRIEF DESCRIPTION OF THE DRAWINGS

Reference will now be made, by way of example, to the accompanying drawings which show example embodiments of the present disclosure, and in which.

Similar reference numerals may have been used in the figures to denote similar components.

DESCRIPTION OF EXAMPLE EMBODIMENTS

Figure 1A:
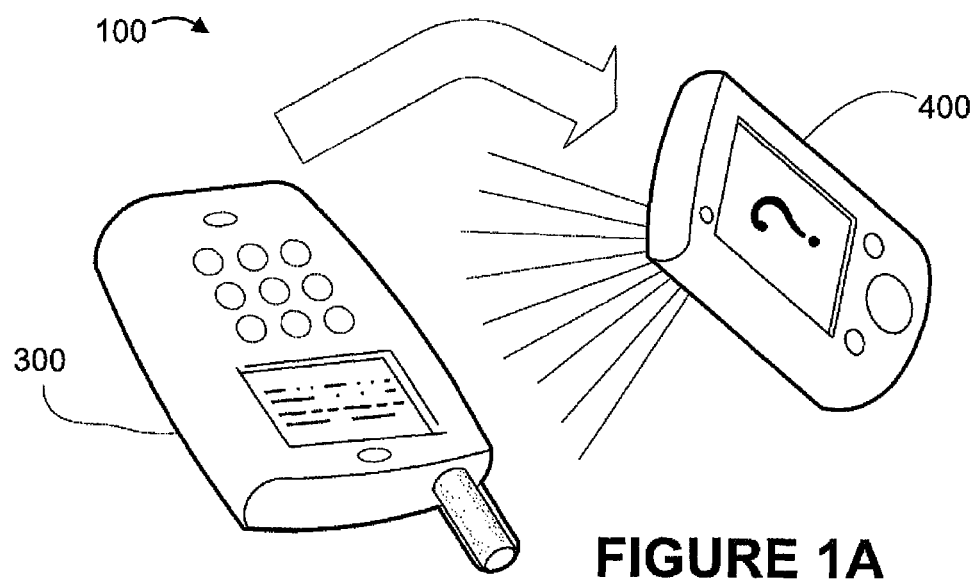
FIG. 1A is a system diagram illustrating one stage of an example system of the present disclosure.

In one aspect, a guest computing device comprises an input mechanism, an output mechanism, a memory having configuration data, verification data and non-transitory computer readable instructions stored thereon and a processor connected to the memory for executing the instructions. The instructions are for obtaining a security code associated with an administrator computing device from the input mechanism, generating a list of device capabilities from the configuration data, generating a verification code in accordance with the security code and the verification data and outputting the list of device capabilities and the verification code through the output mechanism. In one embodiment of this aspect, the list of device capabilities comprises a list of hardware capabilities of the guest computing device. In another aspect, the verification code comprises a cryptographic hash of the security code and the security code comprises a cryptographic hash of a certification data. In another embodiment, at least one of the security code and the verification code is contained in an image. In a further embodiment, the instructions for outputting the list of device capabilities and the verification code through the output mechanism comprise instructions for using the verification code to alter the outputting of the list of device capabilities to the output mechanism. In a yet further embodiment, the instructions for using the verification code to adjust the output of the list of device capabilities to the output mechanism comprise instructions for generating a watermarked list of device capabilities including a watermark generated using the verification code and outputting the watermarked list of device capabilities. In a still further embodiment, the memory comprises further instructions for verifying that the security code is associated with an administrator device authorized to obtain at least some of the capabilities from the configuration data.

In another aspect, an administrator computing device comprises an input mechanism, an output mechanism, a memory having certification data and non-transitory computer readable instructions stored thereon and a processor connected to the memory, for executing the instructions. The instructions are for generating a security code in accordance with the certification data, outputting the security code through the output mechanism, obtaining a verification code associated with a guest computing device from the input mechanism and verifying the verification code in accordance with at least one of the certification data and the security code. In one example embodiment of this aspect, the verification code comprises a cryptographic hash of the security code and the security code comprises a cryptographic hash of the certification data.

In another aspect, a method for outputting a list of device capabilities to an administrator computing device is disclosed. The method comprises obtaining a security code associated with the administrator computing device through an input mechanism, verifying that the security code is associated with the administrator device, generating a list of device capabilities, the list including capabilities from configuration data and outputting the list of device capabilities through an output mechanism. In one example embodiment of this aspect, the method further comprises verifying that the administrator device is authorized to obtain at least some of the list device capabilities from the configuration data and outputting the list of device capabilities through the output mechanism comprises outputting a portion of the list of device capabilities that the administrator computing device is authorized to obtain. In another example embodiment, the method further comprises generating a verification code in accordance with the security code and verification data and outputting the list of device capabilities through the output mechanism comprises outputting the list of device capabilities and the verification code through the output mechanism. In another example embodiment, at least some of the verification data is associated with a verified module. In a further example embodiment, outputting the list of device capabilities and the verification code through the output mechanism comprises using the verification code to alter the outputting of the list of device capabilities to the output mechanism. In yet another example embodiment, using the verification code to alter the output of the list of device capabilities to the output mechanism further comprises generating a watermarked list of device capabilities including a watermark generated using the verification code and outputting the watermarked list of device capabilities. In a further example embodiment, obtaining a security code through an input mechanism comprises capturing an image containing the security code through a camera. In a yet further example embodiment verifying that the security code is associated with the administrator device comprises verifying that the security code was generated in accordance with certification data associated with the administrator device.

In yet another aspect, a method for verifying a verification code on an administrator computing device is disclosed. The method comprises generating a security code in accordance with certification data, outputting the security code through an output mechanism, obtaining a verification code associated with a guest computing device through an input mechanism and verifying the verification code is in accordance with at least one of verification data, the security code and the certification data. In one example embodiment of this aspect, generating the security code in accordance with the certification data further comprises obtaining a pass code and generating the security code in accordance with the certification data and the pass code. In another example embodiment, at least some of the verification data is associated with a verified module associated with the guest computing device. In another example embodiment, obtaining the verification code associated with the guest computing device from the input mechanism comprises capturing an image containing the verification code through a camera.

In a further aspect, a system comprises an administrator computing device and a guest computing device. The administrator computing device includes an input mechanism, an output mechanism, a memory having certification data and non-transitory computer readable instructions stored thereon and a processor connected to the memory, for executing the instructions. The instructions on the administrator computing device are for generating a security code in accordance with the certification data, outputting the security code through the output mechanism of the administrator computing device, obtaining a verification code associated with the guest computing device from the input mechanism of the administrator computing device and verifying the verification code in accordance with at least one of the certification data, and the security code. The guest computing device includes an input mechanism, an output mechanism, a memory having configuration data, verification data and non-transitory computer readable instructions stored thereon and a processor connected to the memory for executing the instructions. The instructions on the guest computing device are for obtaining the security code associated with the administrator computing device from the input mechanism of the guest computing device, generating a list of device capabilities from the configuration data, generating the verification code in accordance with the security code and the verification data, and outputting the list of device capabilities and the verification code through the output mechanism of the guest computing device. In one example embodiment of this aspect, the memory of the guest device comprises further instructions for verifying that the security code is associated with the administrator device, verifying that the administrator device is authorized to obtain at least some of the capabilities from the configuration data and outputting the list of device capabilities and the verification code through the output mechanism of the guest computing device comprises outputting a portion of the list of device capabilities that the administrator device is authorized to obtain. In another example embodiment, the verification code comprises a digital signature based in part on the security code and the security code comprises a digital signature based in part on the certification data. In another example embodiment, the memory of the guest computing device comprises a password and the guest computing device comprises further instructions for restricting access and execution of the instructions of the guest computing device, obtaining a password attempt, comparing the password attempt to the password and in response to the password attempt matching the password, permitting access and execution of the instructions of the guest computing device. In yet another example embodiment, the memory of the guest computing device includes a copy of the certification data of the administrator computing device and the memory of the administrator computing device includes a copy of the verification data of the guest computing device. In still another example embodiment, each of the two input mechanisms comprise at least one of a keyboard, a camera and a touchscreen display and each of the two output mechanism comprise at least one of a display and a touchscreen display. In a further example embodiment, at least one of the security code, the verification code and the list of device capabilities is contained in an image. In a yet further example embodiment, at least one of the administrator device and the guest device comprises a mobile electronic device.

A system, devices and methods are provided for verifying an administrator computing device to a guest computing device, verifying the guest computing device to the administrator computing device and outputting a list of the guest computing device's capabilities for the administrator computing device. By verifying information from the administrator computing device the guest computing device may trust the administrator not to misuse information about the guest computing device's capabilities. By verifying information from the guest computing device the administrator computing device may trust the list of guest computing device capabilities as authentic.

The list of device capabilities provides information about the capabilities and configuration of the guest computing device. In some embodiments the list of device capabilities comprises the hardware and software capabilities of the guest computing device such as the presence of a keyboard, microphone, camera, touchscreen, Wi-Fi, Bluetooth, memory expansion slot, memory card, global positioning system (GPS), accelerometer, or other hardware or the presence of particular software modules and capabilities, such as games, an Internet browser, simple messaging service (SMS), e-mail service, audio recording, image recording or other audiovisual service or other applications and whether or not any of the aforementioned device capabilities are enabled. The list of device capabilities may also comprise security configuration information of the guest computing device including security policy settings, whether any hardware or software has been disabled, such as by an IT policy, and the versions of various internal applications such as the operating system or external certificates. In one example embodiment the list of device capabilities comprises information from an IT policy or a list of all IT policy settings on the guest computing device.

Figure 1B:
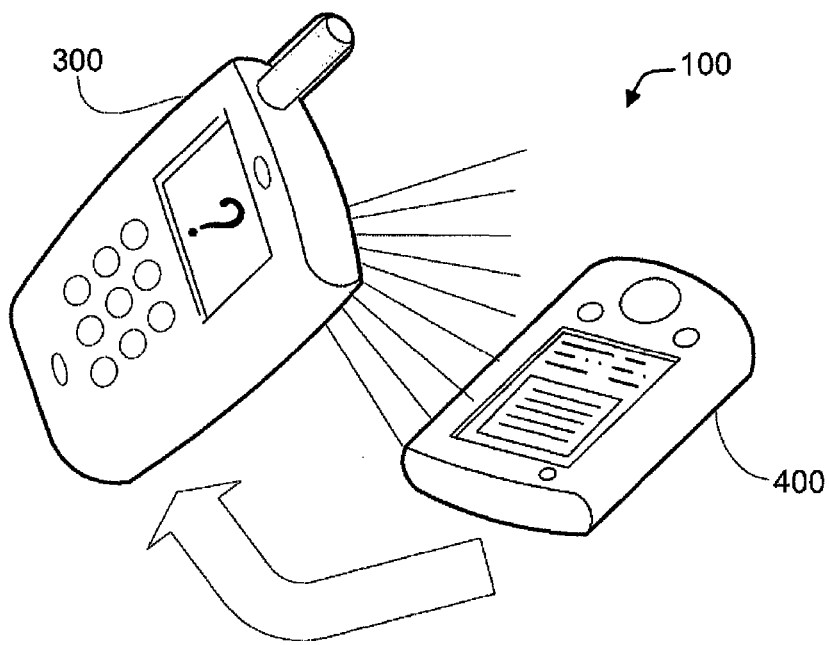
FIG. 1B is a system diagram illustrating another stage of the example embodiment of FIG. 1A.

Reference is now made to FIGS. 1A and 1B which illustrate an exemplary system 100 for authenticating a list of device capabilities. An administrator computing device 300 and a guest computing device 400 present information to verify each other. The guest computing device 400 verifies the administrator computing device 300 to reduce the risk that the guest computing device 400 divulges information about its capabilities to an imposter or other party that could use such information against the guest computing device 400. The administrator computing device 300 verifies the guest computing device 400 to reduce the risk that a malicious guest computing device divulges false information about its capabilities, for example in an effort to circumvent a security check for devices with impermissible capabilities.

In the example embodiment of the system 100 illustrated in FIG. 1A, the administrator computing device 300 generates and outputs a security code and the guest computing device 400 obtains the security code and verifies it. In the specific non-limiting example embodiment illustrated in FIG. 1A, the administrator computing device 300 outputs the security code to a display while a camera on the guest computing device 400 captures an image containing the security code and verifies the security code is associated with the administrator computing device 300. Verifying the security code permits the guest device to identify the administrator computing device or verify that the instructions being executed on the administrator computing device correspond to a module from a trusted entity.

A module comprises, but is not limited to, instructions for execution on a processor of a computing device to perform specific tasks. For non-limiting example, a module includes an application, an application extension, a program, a package, an executable, a library, a process, a script, machine code, human-readable source-code or a compressed format of any of the preceding.

In the example embodiment of the system 100 illustrated in FIG. 1B, the guest computing device 400 generates a verification code and a list of device capabilities of the guest computing device and outputs the verification code and the list of device capabilities. The administrator computing device 300 obtains the verification code and verifies it. In the specific non-limiting example embodiment in FIG. 1B, the guest computing device 400 outputs the verification code and the device capabilities to a display while a camera on the administrator computing device 300 captures an image containing the verification code and verifies the verification code is associated with the guest computing device 400. Verifying the verification code permits the administrator device to identify the guest computing device or verify that the instructions being executed on the guest computing device correspond to a module from a trusted entity. Verifying the verification code also permits the administrator device to verify that the verification code is a response to the security code by identifying part of the security code that the administrator device output within the verification code.

In some embodiments, if the security code cannot be verified, the guest computing device would not generate or display a list of its capabilities to avoid the risk of divulging that information to an unauthorized party. Access to such information about the guest device's configuration could more easily permit a malicious third party to compromise the guest computing device 400.

If the verification code is verified, the administrator computing device 400 can trust that the list of device capabilities is authentic. If the verification code cannot be verified then the administrator computing device 300 cannot trust the list of device capabilities output by the guest computing device 400 as authentic. For example, the list of device capabilities may be fraudulent, such as where a malicious guest device is attempting to hide its capabilities to gain access to an area restricted to devices having particular capabilities.

In example embodiments such as those illustrated in FIGS. 1A and 1B, where the guest computing device captures an image containing the security code or the administrator computing device captures an image containing the verification code, the security code and the verification code can comprise, for non-limiting example, a barcode, a UPC-A code, a two dimensional barcode, a matrix code, a QR Code®, MicroQR code, a MaxiCode, a watermark or any other image or video into which a code can be inserted and extracted.

In the specific example system illustrated in FIGS. 1A and 1B, the display and capture of the security code and the verification code occur when the administrator computing device 300 and the guest computing device 400 are physically proximate to one another. In this embodiment, the security code, verification code and device capabilities are not broadcast and consequently the opportunity for a third party to observe or record this information is reduced. Furthermore, it would be difficult for another device to substitute information into the system. In contrast, a broadcast signal such as wireless or Bluetooth® could be covertly substituted from a third party device. In some example embodiments, the verification code comprises a digital signature based in part on the security code and the security code comprises a digital signature based in part on the certification data. In some example embodiments, the certification data, the verification data or both include unique private certificates provided by a trusted entity. The trusted entity may also maintain publicly accessible processes or data to verify that information was generated by the device or module provided with a unique private certificate. In some example embodiments, the instructions executed on the administrator computing device and the instructions executed on the guest computing device are compiled into the same module.

One skilled in the art will readily understand that the administrator computing device and the guest computing device of the present disclosure may be implemented in any conventional computing device. Embodiments of the administrator computing device 300 and the guest computing device 400 of the present disclosure are not limited to any particular operating system, electronic device architecture, server architecture, or computer programming language. It is to be understood that alternate embodiments are feasible. Either computing device 300, 400 may comprise a mobile electronic device 201 described below or any other computing device including but not limited to a mobile telephone, a smartphone, a mobile handheld device, a personal digital assistant, a portable gaming console, a personal computer, a desktop computer, a laptop, a notepad and the like.

Figure 2:
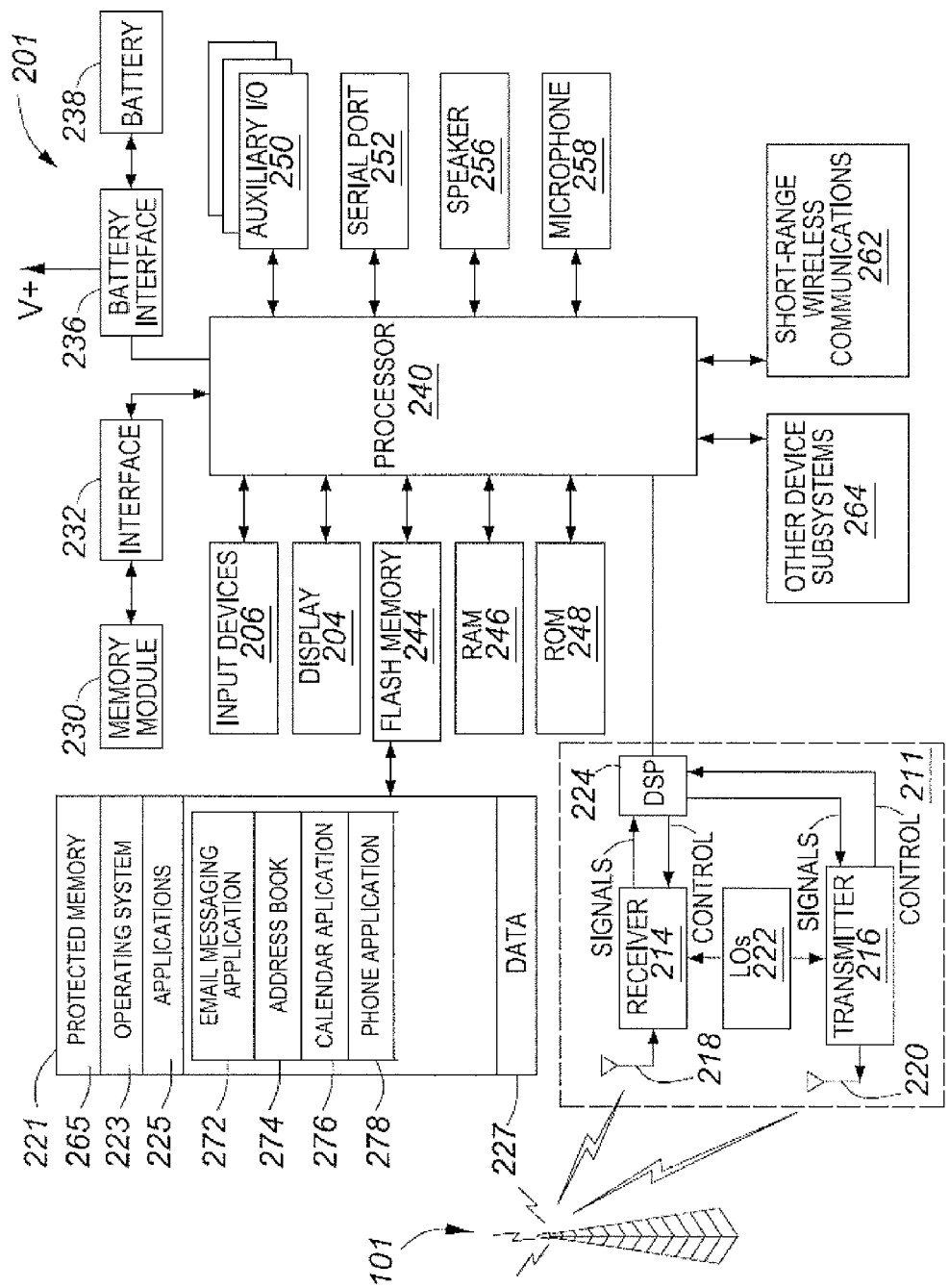
FIG. 2 is a block diagram illustrating a mobile electronic device capable of implementing an example embodiment of the guest computing device or the administrator computing device of the present disclosure.

Reference is now made to FIG. 2 which illustrates an exemplary embodiment of a mobile electronic device 201 which can form an embodiment of the administrator device 300 or the guest computing device 400. The mobile electronic device 201 is a two-way communication device having data and voice communication capabilities, and the capability to communicate with other computer systems, for example, via the Internet. Depending on the functionality provided by the mobile electronic device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile electronic device 201 includes a rigid case (not shown) housing the components of the device 201. The internal components of the device 201 are constructed on a printed circuit board (PCB). The mobile electronic device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations 108 of the wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276 and a phone application 278 for non-limiting example.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application. Where the mobile device 201 embodies an administrator computing device 300, a guest computing device 400 or both, an application such as a verified application containing instructions 390, 490 respectively associated with the administrator computing device 300 and the guest computing device 400 may also be included in the software applications 225, the software modules 221 or in other memory locations on the mobile device 201 or in any combination thereof.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Figure 3:
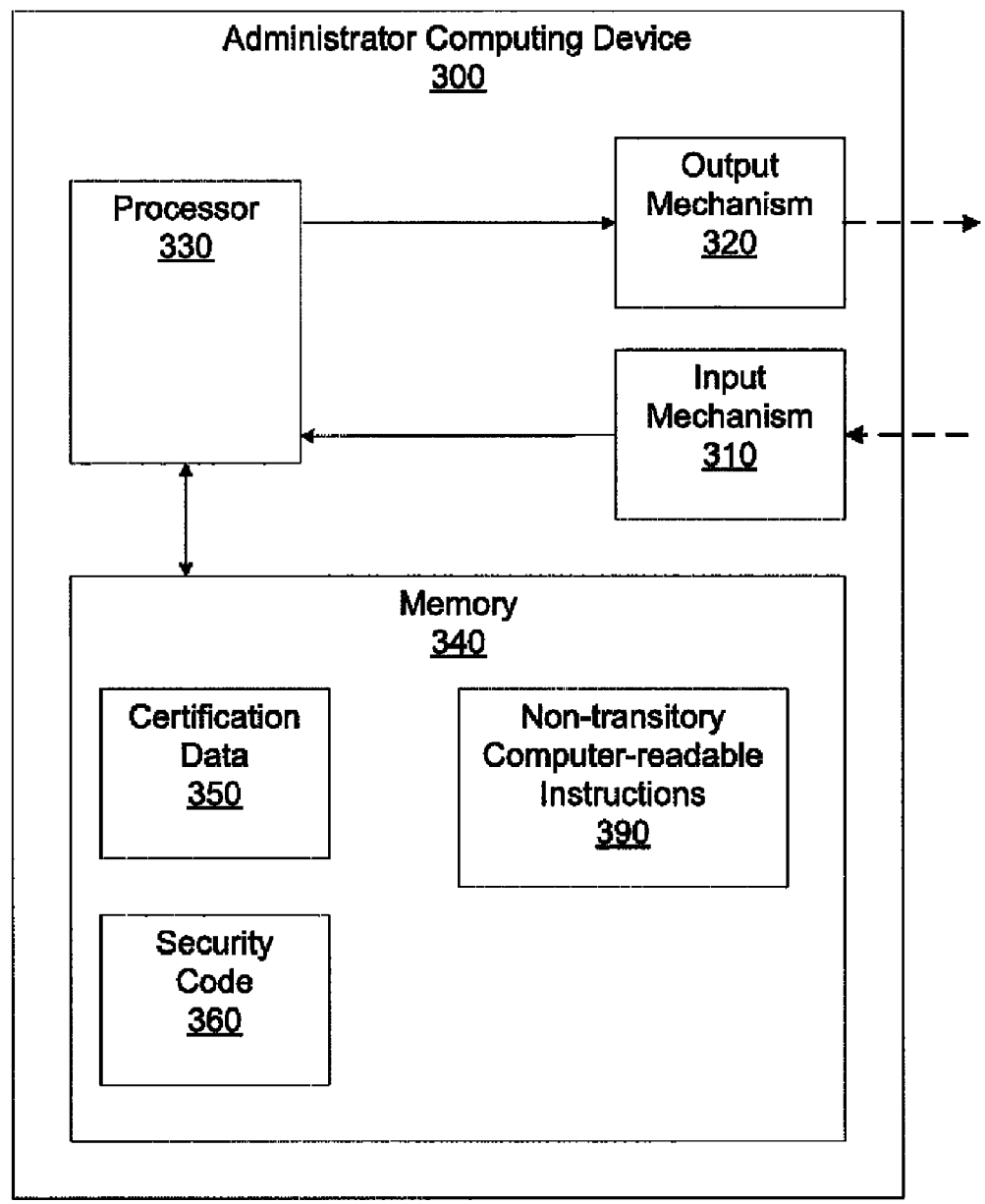
FIG. 3 is a block diagram illustrating an example administrator computing device according to the present disclosure.

Referring now to FIG. 3, the administrator computing device 300 comprises an input mechanism 310, an output mechanism 320, a processor 330 and a memory 340.

The input mechanism 310 obtains information such as information displayed on or transmitted from the guest computing device 400 or information entered by an administrator through the input mechanism 310. The input mechanism 310 comprises at least one of a camera, a keyboard, a touchscreen display, a wireless receiver, a Bluetooth® receiver, a microphone and other devices for manual or automated input of information into the administrator computing device 300. The input mechanism 310 is connected to the processor 330. In some embodiments, the input mechanism 310 is also connected to other components of the administrator computing device 300.

The output mechanism 320 transmits information from the administrator computing device 300. The output mechanism 320 comprises at least one of a display, a touchscreen display, a wireless transmitter, a Bluetooth® transmitter, a speaker and other output devices for transmission or display of information on the administrator computing device 300. The output mechanism 320 is connected to the processor 330. In some embodiments, the output mechanism 320 is also connected to and other components of the administrator computing device 300.

The memory 340 stores data including instructions for execution on the processor 330 and data to be accessed by those instructions such as certification data 350, security code 360 and verification code 460 associated with the guest computing device 400. Non-transitory computer readable instructions 390 are stored in the memory 340 for configuring the processor 330. Non-limiting examples of the memory 340 include flash memory 244, protected memory 265 and memory module 230 of mobile electronic device 201.

The processor 330 executes instructions, generates data and controls the operability of the administrator computing device 300. The processor 330 is connected to the input mechanism 310, the output mechanism 320 and the memory 340. Non-limiting examples of the processor 330 include processor 240 of mobile electronic device 201. The processor 330 is configurable to generate a security code 360 in accordance with the certification data 350 and output the security code 360 through the output mechanism 320. The processor 330 is configurable to receive a verification code 460 associated with the guest computing device 400 through the input mechanism 310 and verify the verification code 460 in accordance with at least one of the certification data 350 and the security code 360.

The certification data 350 identifies the administrator computing device 300 or a module executing on the administrator computing device comprising instructions 390. In some example embodiments, the certification data 350 comprises a unique identifier to the administrator computing device 300, a preloaded private certificate assigned by a trusted entity, a signed output associated with the instructions 390 or a value associated with a verified module comprising the instructions 390. In some example embodiments, the certification data 350 is associated with the instructions 390 when the instructions 390 are assembled into a module.

In some example embodiments, the certification data 350 comprises a private certificate assigned by a trusted entity, such as the manufacturer of the administrator computing device 300 or a certification authority. In these example embodiments, the trusted entity may also make available a root certificate for verification of information signed in accordance with the private certificate. In other example embodiments, the certification data 350 is associated with the instructions 390 to identify the author of the instructions 390 as a trusted entity. In some embodiments, the certification data 350 may identify the author such that the instructions 390 are granted access to private application programming interfaces (APIs) on the administrator computing device 300.

The certification data 350 is provided on the administrator computing device 300 to generate a security code 360 that can be output by the administrator computing device 300 through the output mechanism 320 and verified by the guest computing device 400 as associated with the administrator computing device 300 or with a module comprising the instructions 390.

In some example embodiments of the administrator computing device 300, the security code 360 comprises a digital signature of some of the certification data 350 and at least one of a pass code and a time stamp. Such a digital signature can be generated by a trusted entity comprising information to identify the trusted entity, certificate use, and other standard certificate information. Use of the certification data permits the transaction to subsequently be audited for authenticity. The pass code may be a unique password or random phrase or gesture entered by an administrator on a keyboard or touchscreen or a random number generated on the administrator computing device 300. The time stamp, pass code and certification data may be combined to generate the security code 360 as a digital signature to decrease the risk that the certification data 350 can be uncovered from the security code 360 and be used to impersonate the administrator computing device and obtain knowledge of the device capabilities of the guest computing device 400. In the wrong hands, this knowledge could be used to compromise or attack the security of the guest computing device 400.

In some embodiments, the certification data 350, the verification data 450 or both are generated by a process of digitally signing the associated module to confirm the author of the instructions comprising that module and guarantee that those instructions have not been altered or corrupted since the module was signed by use of, for non-limiting example, a cryptographic hash. Cryptographic hash methods include, but are not limited to MD5, SHA-1, AES, 3-DES, EAX, ECC and other deterministic functions that process an arbitrary length datum into a fixed-length datum such that an accidental or intentional change to the data can be detected.

The non-transitory computer readable instructions 390 comprise a set of instructions such as a module or a verified module that configure the processor 330 to operate the administrator computing device 300 in a specific manner. In some embodiments, this module is contained in software modules 221 or software applications 225 of a mobile device 201.

The verified module comprises a set of instructions that are associated with an expected output such as a digital signature or a signed output. In some verified modules, modification of the set of instructions comprising the verified module can be detected because an output from the modified module does not match the expected output associated with the verified module. By distributing copies of a verified module's expected output to devices that will interact with that verified module, those devices can verify that the module is unmodified by comparing the module output to the copy of the expected output. Consequently, the devices can expect the module to cause the device on which the module is executing to behave in a specific, expected manner. In some embodiments, at least some of the certification data 350 is associated with a verified module comprising the instructions 390 of the administrator computing device 300. In some embodiments, at least some of the verification data 450 is associated with a verified module comprising the instructions 490 of the guest computing device 400.

In some embodiments the module or the verified module comprises the non-transitory computer readable instructions 390 and the non-transitory computer readable instruction 490 such that the certification data 350 and the verification data 450 are contained within the same module copies of which are executing instructions on the administrator computing device 300 and the guest computing device 400. In such embodiments, the verification data 450 may comprise the certification data 350. In such embodiments it is not necessary for processes or data for verifying the certification data 350 or the verification data 450 to be made publicly available.

The processor 330 is configured by non-transitory computer readable instructions 390 stored in the memory 340 to output the security code 360 through the output mechanism 320. The security code 360 is output for input by the guest computing device 400. In one example embodiment, the security code 360 is output on a display screen or touchscreen. In other example embodiments, the security code 360 may be broadcast using audio, Wi-Fi or Bluetooth® for non-limiting example.

The processor 330 is configured by non-transitory computer readable instructions 390 stored in the memory 340 to obtain a verification code 460 associated with the guest computing device 400 through the input mechanism 310. In one example embodiment, the verification code 460 is obtained through a camera capturing an image containing the verification code 460 displayed on the guest computing device 400. In another example embodiment the verification code 460 is entered on a keyboard or touchscreen by an administrator observing the verification code 460 displayed of the guest computing device 400. In this example embodiment, the verification code 460 may comprise a string of alphanumeric characters.

The processor 330 is further configured by non-transitory computer readable instructions 390 stored in the memory 340 to verify the verification code 460 in accordance with at least one of the certification data 350 and the security code 360. Verification of the verification code 460 confirms to the administrator device whether or not the verification code 460 was generated by the guest computing device 400, by a verified module executing on the guest computing device 400 or by a trusted entity. Verification of the verification code 460 may also confirm to the administrator computing device 300 whether or not the verification code 460 was generated based on the security code 360 to reduce the risk of fraudulent information being offered by the guest computing device 400. In some example embodiments, the verification code 460 comprises a digital signature of the security code 360 or an output of a module comprising instructions 390.

Figure 4:
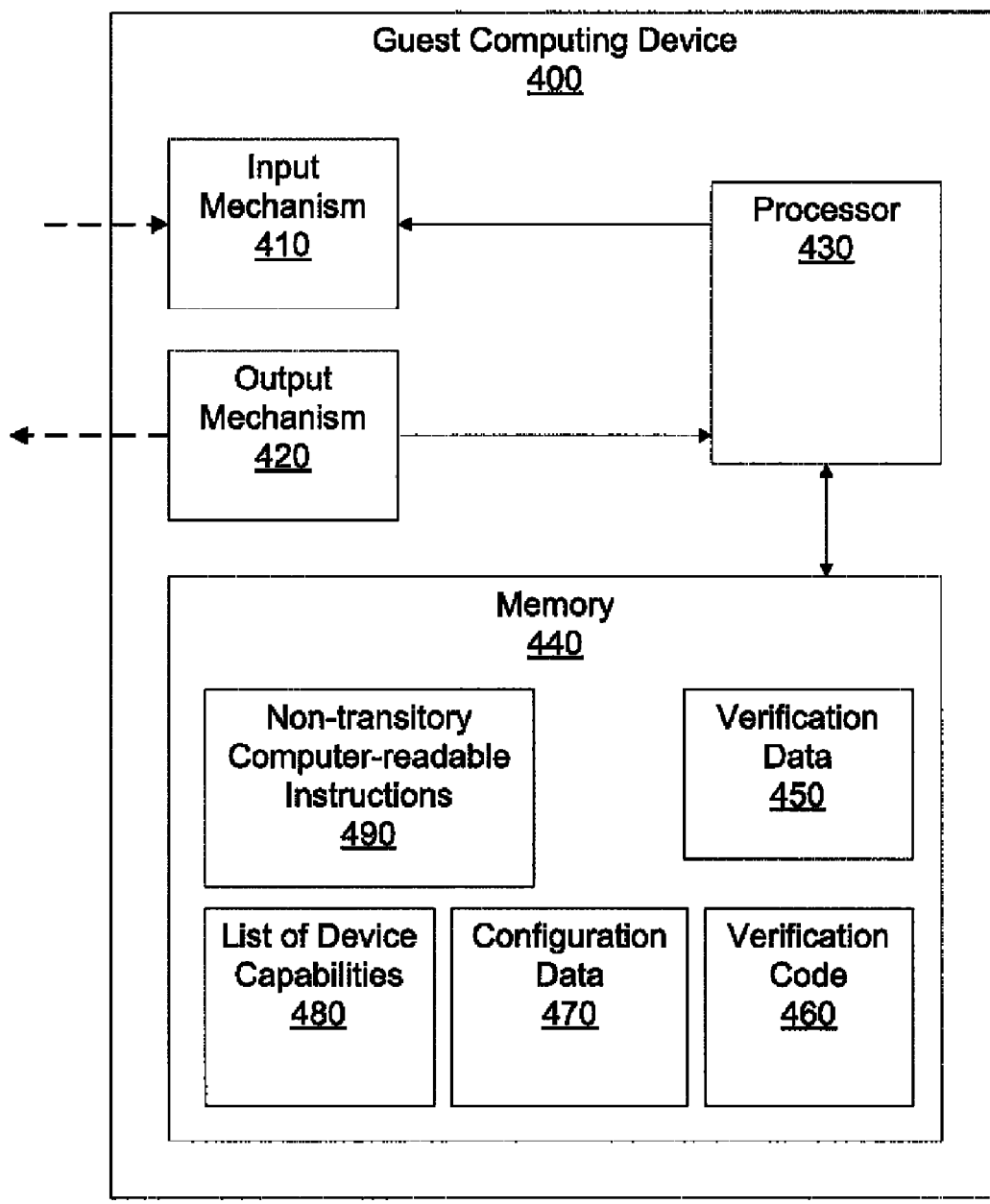
FIG. 4 is a block diagram illustrating an example guest computing device according to the present disclosure.

Referring now to FIG. 4, the guest computing device 400 comprises an input mechanism 410, an output mechanism 420, a processor 430 and a memory 440.

The input mechanism 410 obtains information such as information displayed on or transmitted from the administrator computing device 300 and information entered by a guest through the input mechanism 410. The input mechanism 410 comprises at least one of a camera, a keyboard, a touchscreen display, a wireless receiver, a Bluetooth® receiver, a microphone and other devices for manual or automated input of information into the guest computing device 400. The input mechanism 410 is connected to the processor 430 and other components of the guest computing device 400.

The output mechanism 420 transmits information from the guest computing device 400. The output mechanism 420 comprises at least one of a display, a touchscreen display, a wireless transmitter, a Bluetooth® transmitter, a speaker and other output devices for transmission or display of information on the guest computing device 400. The output mechanism 420 is connected to the processor 430. In some embodiments, the output mechanism 320 is connected to other components of the guest computing device 400.

The memory 440 stores data including instructions for execution on the processor 430 and data to be accessed by those instructions such as verification data 450, configuration data 470, a security code 360 associated with the administrator computing device 300 and a list of device capabilities 480 of the guest computing device 400. Non-transitory computer readable instructions 490 are stored in the memory 440 for configuring the processor 430. Non-limiting examples of the memory 440 include flash memory 244, protected memory 265 and memory module 230 of mobile electronic device 201.

The processor 430 executes instructions, generates data and controls the operability of the guest computing device 400. The processor 430 is connected to the input mechanism 410, the output mechanism 420 and the memory 440. Non-limiting examples of the processor 430 include processor 240 of mobile electronic device 201. The processor 430 is configurable to receive a security code 360 associated with an administrator computing device 300 through the input mechanism 410. The processor 430 generates a list of device capabilities 480 from the configuration data 470 and generates a verification code 460 in accordance with the security code 360 and verification data 450 of the guest computing device 400. The processor 430 outputs the list of device capabilities 480 and the verification code 460 through the output mechanism 420.

The configuration data 470 comprises information about the configuration of the guest computing device 400. In some embodiments the configuration data 470 comprises the hardware and software capabilities of the guest computing device 400 such as the presence of a keyboard, microphone, camera, touchscreen, Wi-Fi, Bluetooth, memory expansion slot, memory card, global positioning system (GPS), accelerometer, or other hardware or the presence of particular software modules and capabilities, such as games, an Internet browser, simple messaging service (SMS), e-mail service, audio recording, image recording or other audiovisual service or other applications and whether or not any of the aforementioned device capabilities are enabled. The configuration data 470 may also comprise security configuration information of the guest computing device 400 including security policy settings, whether any hardware or software has been disabled, such as by an IT policy, and the versions of various internal applications such as the operating system or external certificates. In one example embodiment the configuration data 470 comprises an IT policy list or a list of all IT policy settings on the guest computing device 400.

The list of device capabilities 480 generated from the configuration data 470 comprises any subset of the information contained in the configuration data 470. The list of device capabilities 480 provides information about the capabilities and configuration of the guest computing device. In some embodiments the list of device capabilities 480 can be adjusted by settings on the guest computing device 400 or limited based on the authorization granted to the administrator computing device 300.

The verification data 450 identifies the guest computing device 400 or a module executing on the guest computing device comprising instructions 490. In some example embodiments, the verification data 450 comprises a unique identifier to the administrator computing device 400, a pre-loaded private certificate assigned by a trusted entity, a signed output associated with the instructions 490 or a value associated with a verified module comprising the instructions 490. In some example embodiments, the certification data 350 is associated with the instructions 390 when the instructions 390 are assembled into a module.

In some example embodiments, the verification data 450 comprises a private certificate assigned by a trusted entity, such as the manufacturer of the guest computing device 400 or a certification authority. In these example embodiments, the trusted entity may also make available a root certificate for verification of information signed in accordance with the private certificate. In other example embodiments, the verification data 450 is associated with the instructions 490 to identify the author of the instructions 490 as a trusted entity. In some embodiments, the verification data 450 may identify the author such that the instructions 490 are granted access to private application programming interfaces (APIs) on the guest computing device 400.

The verification data 450 is provided on the guest computing device 400 to generate a verification code 460 that can be output by the guest computing device 400 through the output mechanism 420 and verified by the administrator computing device 300 as associated with the guest computing device 400 or the verified module contained in memory 440.

In some example embodiments of the guest computing device 400, the verification code 460 comprises a digital signature of the verification data 450 or a digital signature of the verification data 450 and the security code 360 of an administrator computing device 300 when obtained through the input mechanism 410 of the guest computing device 400. The verification code 450 may also include a pass code such as a unique password input on the guest computing device 400 through, for non-limiting example, a keyboard or touchscreen. The verification code 460 is generated in such a manner that when it is obtained by the administrator computing device 300, the administrator computing device 300 can verify that the verification code 460 is associated with the guest computing device 400 and may also verify that the verification code 460 is associated with the security code 360 generated and output by the administrator computing device 300.

In some embodiments, the verification data 450, the certification data 350 or both are generated by a process of digitally signing the associated module to confirm the author of the instructions comprising that module and guarantee that those instructions have not been altered or corrupted since the module was signed by use of, for non-limiting example, a cryptographic hash.

The non-transitory computer readable instructions 490 comprise a set of instructions such as a module or a verified module that configure the processor 430 to operate the guest computing device 400 in a specific manner. In some embodiments, the verification data 450 or certification data 350 comprise expected output or signed output of the corresponding verified modules of their respective device's instructions 490, 390. In some embodiments, this module is contained in software modules 221 or software applications 225 of a mobile device 201.

The processor 430 is configured by non-transitory computer readable instructions 490 stored in the memory 440 to obtain a security code 360 associated with an administrator computing device 300 through the input mechanism 410. In one example embodiment, this security code 360 is obtained through a camera capturing an image of the security code 360 displayed on the administrator computing device 300. In another example embodiment the security code 360 is entered on a keyboard or touchscreen by a guest observing the security code 360 displayed on the administrator computing device 300. In this example embodiment the security code 360 may comprise a string of alphanumeric characters.

In some example embodiments the processor 430 is configured by further non-transitory computer readable instructions 490 stored in the memory 440 to verify the security code 360 is associated with the administrator computing device 300 or a verified module associated with the instructions stored in memory 330 of the administrator computing device 300. If verification of the security code 360 fails, in some embodiments the guest computing device 400 will restrict execution of the instructions in memory 440 for example restricting or preventing access to the configuration data 450, the list of device capabilities 480 or outputting of the list of device capabilities 480. This form of restriction of execution of the instructions may also be employed in some embodiments where execution of the instructions in memory 440 is restricted until a password attempt is input on the guest computing device 400 and the password attempt, when compared to a password stored in memory 440, matches. This additional layer of security prevents malicious or unintended access to the configuration data and list of device capabilities which, if accessed, could provide an attacker with the information necessary to more expediently compromise the guest computing device 400.

The processor 430 is configured by non-transitory computer readable instructions 490 stored in the memory 440 to generate a list of device capabilities 480 of the guest computing device 400 from the configuration data 470. As described above, the list of device capabilities 480 comprises a variety of possible configuration information about the guest computing device 400 or a subset thereof based on settings on the guest computing device 400 or based on the access granted to the requesting administrator computing device 300. In some embodiments only a portion of the list of device capabilities 480 is output by the guest computing device 400 determined based on the authorization of the administrator computing device 300. In some example embodiments, the authorization of the administrator computing device 300 may be determined during verification of the security code 360 by the guest computing device 400 or in further instructions.

The processor 430 is configured by non-transitory computer readable instructions 490 stored in the memory 440 to generate a verification code 460 in accordance with the security code 360 and the verification data 450. The verification code 460 is generated in such a manner that the administrator computing device 300 can verify that the verification code 460 is associated with the guest computing device 400, some of the security code 360 or both. In some example embodiment the verification code 460 is generated as a digital signature of the some of verification data 450, some of the security code 360 or both. In some example embodiments, the verification code 460 comprises an output of a module comprising instructions 490.

The processor 430 is configured by non-transitory computer readable instructions 490 stored in the memory 440 to output the list of device capabilities 480 and the verification code 460 through the output mechanism 420. In one example embodiment, the list of device capabilities 480 is output to a display or touchscreen. The list of device capabilities 480 is output to be observed or recorded by the administrator operating the administrator computing device 300. In some example embodiments the administrator computing device 300 is capable of obtaining the list of device capabilities 480. The verification code 460 is output for input by the administrator computing device 300 to verify the verification code 460 and thereby confirm that the list of device capabilities 480 output by the guest computing device 400 is authentic. In some example embodiments, the list of device capabilities 480 and the verification code 460 are output concurrently to prevent a guest computing device 400 from outputting the verification code 460 and separately outputting a falsified list of device capabilities such as from a different module or different instructions. In some example embodiments, outputting of the list of device capabilities 480 and the verification code 460 comprises using the verification code 460 to alter the outputting of the list of device capabilities 480 to the output mechanism 420. In further example embodiments, outputting of the verification code 460 and the list of device capabilities 480 comprises generating a watermarked list of device capabilities including a watermark generated using the verification code 460 and outputting the watermarked list of device capabilities. In some example embodiments, outputting the verification code 460 to the output mechanism 420 comprises outputting an image of the verification code 460 to a display or touch screen. In other example embodiments, the verification code 460 may be broadcast using audio, Wi-Fi or Bluetooth® for non-limiting example.

In another embodiment of the present disclosure, the instructions for obtaining a security code through an input mechanism, verifying that the security code is associated with the administrator device, generating a list of device capabilities, the list including capabilities from configuration data, and outputting the list of device capabilities through an output mechanism are contained in computer-readable code within a computer-readable medium such that the code is executable on at least one processor of a mobile electronic device, such as device 201.

In a further embodiment of the present disclosure the instructions for obtaining a security code through an input mechanism, verifying that the security code is associated with the administrator device, generating a list of device capabilities, the list including capabilities from configuration data, and outputting the list of device capabilities through an output mechanism are contained in computer-readable code within a computer-readable medium such that the code is executable on at least one processor of a mobile electronic device, such as device 201.

In a yet further embodiment of the present disclosure, a computer-readable code may comprise a verified module comprising at least one of instructions 390, instructions 490 and other instructions.

Figure 5:
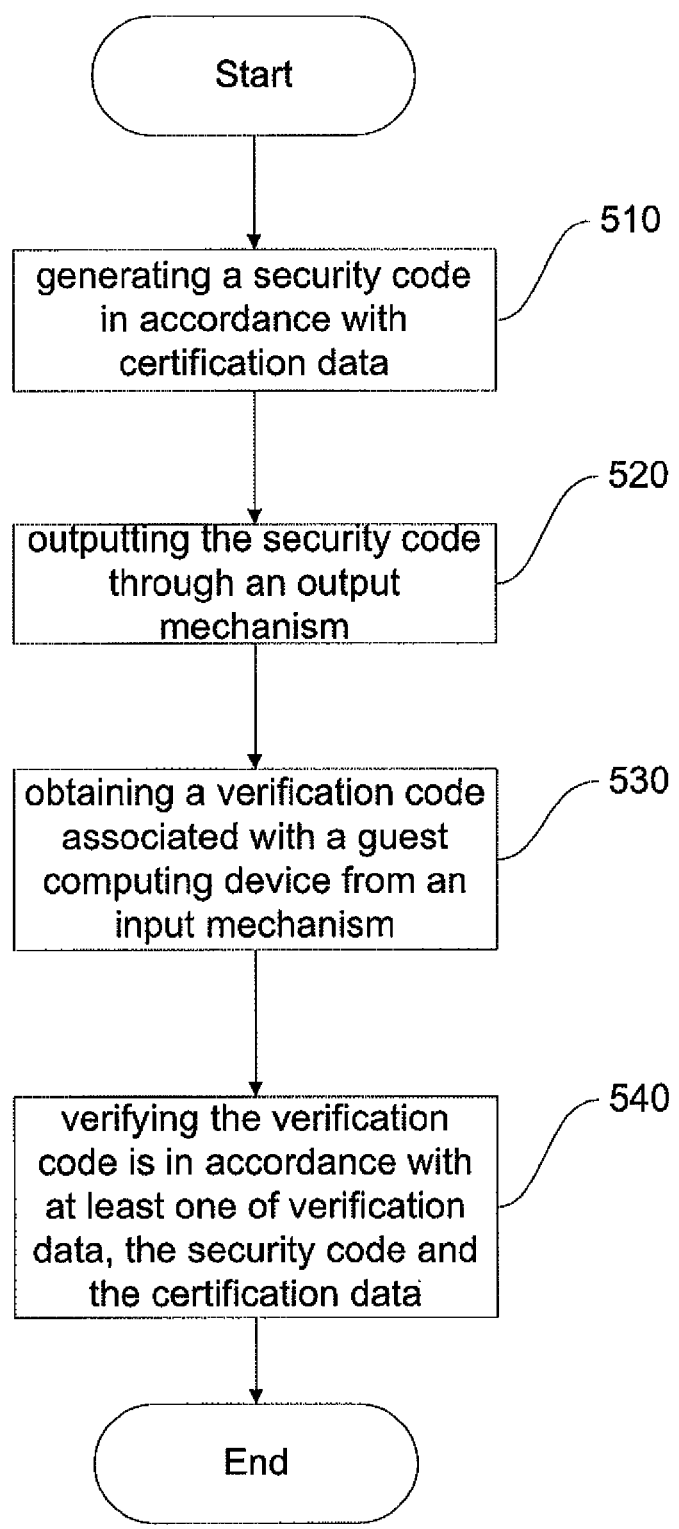
FIG. 5 is a flow chart of an example operation of an administrator computing device according to the present disclosure.

Referring now to FIG. 5, an example method of operation of an administrator computing device 300 is illustrated. One skilled in the art will readily understand that other sequences of operation are also possible and within the scope of the present disclosure.

At 510, the administrator computing device 300 generates a security code 360 in accordance with certification data 350. The purpose of the security code 360 is to permit a device receiving the security code to be able to identify that the security code is associated with the administrator computing device or a trusted entity. In some example embodiments generating the security code 360 comprises obtaining a pass code on the administrator computing device 300 and generating the security code 360 in accordance with the certification data 350 and the pass code. In this way, some of the certification data 350 can be better maintained private to the administrator computing device 300. If all of the certification data 350 was known to another party, that party could impersonate the administrator computing device and trick guest computing devices into divulging their capabilities to them. Consequently, a pass code can be added to the generation of the security code 360 to make extracting the certification data 350 from the security code 360 more difficult.

In some embodiments, obtaining the pass code can comprise obtaining a string of characters on a keyboard or touchscreen, forming a gesture on a touchscreen, capturing an image with a camera or other readily available information input methods. Obtaining the pass code can also comprise inputting a random number from a random number generator. The inclusion of a pass code in the security code 360 also decreases the chances that a malicious guest computing device can reuse a previous security code 360 or verification code 460 to trick the administrator computing device 400 into believing falsified guest device capabilities. To further protect the certification data 350 and randomize the security code 360, in some example methods of operation, generating the security code 360 can include generating the security code in accordance with a time stamp.

In some example embodiments, the security code 360 may comprise a digital signature of the certification data 350, the pass code, the time stamp, an output of a verified module associated with instructions 390 or any combination of these.

At 520, the administrator computing device 300 outputs the security code 360 through an output mechanism 320 such as a display, touchscreen display, a wireless transmitter or other output device.

At 530, the administrator computing device 300 obtains a verification code 460 associated with a guest computing device 400 through an input mechanism 310. In some example methods of operation, obtaining the verification code 460 through an input mechanism 310 comprises capturing an image containing the verification code 460 through a camera. In other example methods of operation, obtaining the verification code 460 comprises obtaining the verification code 460 through at least one of a keyboard and a touchscreen display. In other example methods of operation, the obtaining comprises receiving the verification code through a microphone, wireless receiver, Bluetooth® receiver or the like.

At 540, the administrator computing device 300 verifies the verification code 460 in accordance with at least some of the security code 360 and certification data 350. In some example embodiments, the administrator computing device 300 verifies the verification code 460 in accordance with a copy of the verification data stored on the administrator device 400. For example, in a non-limiting embodiment, the administrator computing device 300 and the guest computing device 400 may be executing the same module.

The purpose of verifying the verification code 460 is to ensure that the verification code 460 was actually generated by the guest computing device 400 and not by some other device or some other module on the guest computing device 400. Furthermore, if the verification code 460 was generated in accordance with a security code 360 generated by the administrator computing device, the administrator computing device 300 may verify that the verification code 460 was generated by the guest computing device 400 in response to the administrator computing device's security code 360. In this way, the administrator computing device 300 can avoid being tricked into accepting an old list of device capabilities from the guest computing device 400, when the guest computing device's capabilities may have changed since the last time the two devices interacted.

Where the verification code 460 is verified, the administrator device 300 may accept the displayed list of device capabilities 480 of the guest computing device 400 as authentic.

Figure 6:
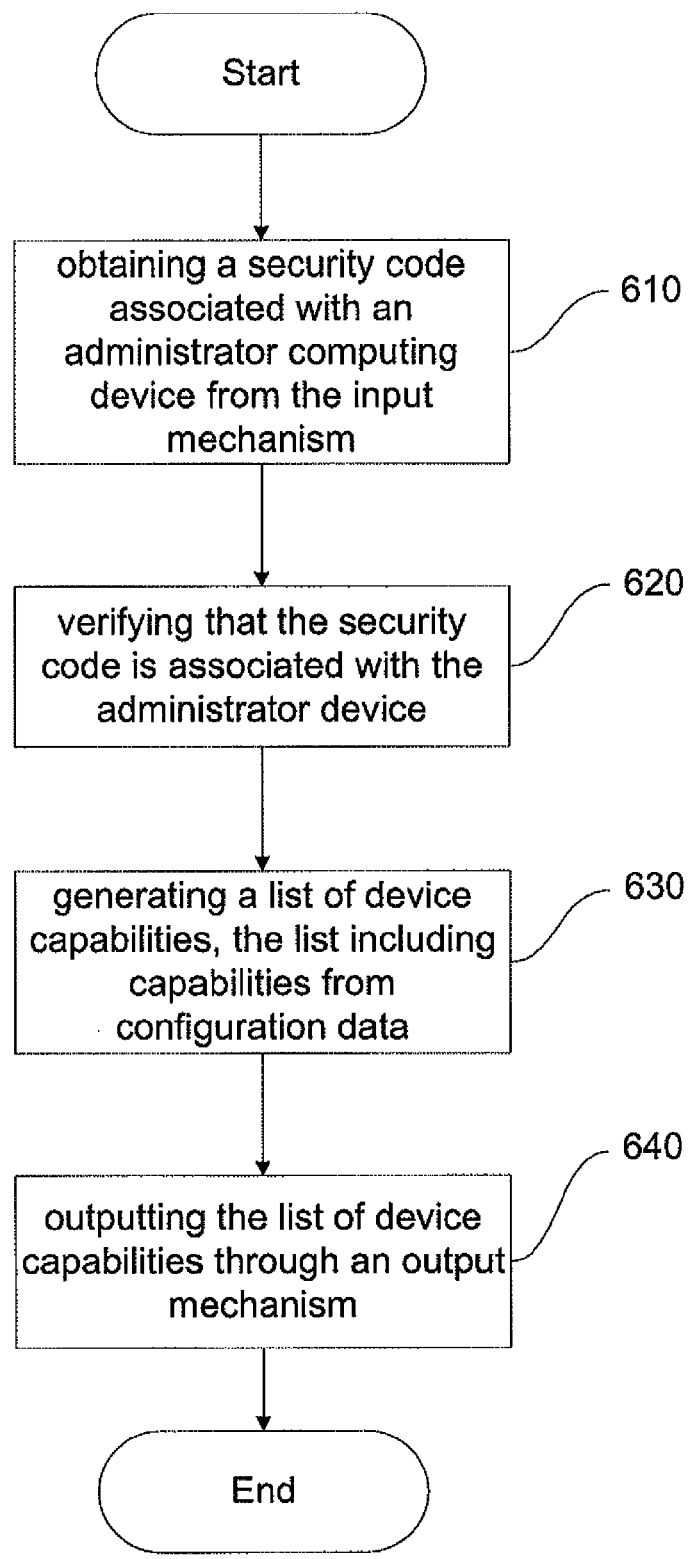
FIG. 6 is a flow chart of an example operation of a guest computing device according the present disclosure.

Turning now to FIG. 6, an example method of operation of a guest computing device 400 is illustrated. The example method of operation outputs a list of device capabilities 480 to an administrator computing device 300. One skilled in the art will readily understand that sequences of operation other than the sequence of operation illustrated and described below are possible and within the scope of the present disclosure.

At 610, the guest computing device 400 obtains a security code 360 associated with an administrator device 300 through an input mechanism 410. In some example methods of operation, obtaining the security code 360 through an input mechanism 410 comprises capturing an image containing the security code 360 through a camera. In other example methods of operation, obtaining the security code 360 comprises obtaining the security code 360 through at least one of a keyboard and a touchscreen display.

At 620, the guest computing device 400 verifies that the security code 360 is associated with the administrator device 300 or a trusted entity. In some example embodiments the guest computing device 400 verifies the security code 360 in accordance with a copy of the certification data stored on the guest computing device 400. For example, in a non-limiting embodiment, the administrator computing device 300 and the guest computing device 400 are executing copies of the same module.

The purpose of verifying the security code 360 is associated with the administrator computing device 300 is to ensure that the device requesting a list of device capabilities 480 from the guest computing device 400 is actually the device that it purports to be. If the security code 360 cannot be verified, the security code 360 may be from a device that is not the administrator computing device 300 in which case generating or outputting the list of device capabilities may compromise the configuration data 470 of the guest computing device 400. An imposter could attempt to request the list of device capabilities 480 from the guest computing device 400 to attack and compromise the guest computing device 400. If an attacker became aware of some of the configuration of the guest computing device 400 it may become much easier to compromise the guest computing device. Consequently, verification of the security code 360 permits the guest computing device 400 to identify the administrator computing device 300 or the module comprising instructions 390.

Some example methods of operation of the guest computing device 400 further comprise verifying that the administrator computing device 300 is authorized to obtain at least some of the list of device capabilities 480 from the configuration data 470. Some administrator computing devices may only be authorized for output of some of the list of device capabilities 480, such as whether a security policy on the guest computing device 400 has disabled the camera but not authorized to obtain other device capabilities such as the version of the security or encryption software installed on the guest computing device 400.

At 630, the guest computing device 400 generates a list of device capabilities 480. The list includes capabilities from configuration data 470 of the guest computing device 400. Generating the list of device capabilities 480 from configuration data 470 has been described above.

At 640, the guest computing device 400 outputs the list of device capabilities 480 through an output mechanism 420. In some example methods of operation of the guest computing device 400 where a list of all device capabilities was generated, outputting the list of device capabilities may comprise outputting a portion of the list of device capabilities 480 that the administrator computing device 300 is authorized to obtain.

Some example methods of operation of the guest computing device 400 further comprise generating a verification code 460 in accordance with the security code 360 associated with the administrator computing device 300 and verification data 450 on the guest computing device 400. In such example methods of operation of the guest computing device 400, outputting the list of device capabilities 480 further comprises outputting the list of device capabilities 480 and the verification code 460. The purpose of outputting the verification code 460 in connection with the list of device capabilities 480 is to permit another device obtaining the verification code 460 to identify that the list of device capabilities 480 was generated by a guest computing device 400 that can be verified. In some example embodiments, the verification code 460 is generated as a digital signature of some of the security code 360, some of the verification data 450 or both. The digital signature can be verified by the administrator computing device 300. In other example embodiments, the verification code 460 is a signed output or digital signature of a verified module.

In some example methods of operation of the guest computing device 400 where a verification code 460 is generated, outputting the verification code 460 and the list of device capabilities 480 comprises generating a watermarked list of device capabilities including a watermark generated using the verification code 460 and outputting the watermarked list of device capabilities. In this way, the verification code 460 and the list of device capabilities 480 are concurrently output and may be more difficult to separate and falsify. If the verification code 460 and the list of device capabilities 480 are not output concurrently, it may be possible for a malicious guest computing device to output the verification code 460 then switch to a different module that displays a false set of device capabilities.

In one example embodiment of the present disclosure, a trusted entity authors a module comprising the instructions 390 of the administrator computing device 300 and the instructions 490 of the guest computing device 400 wherein the certification data 350 and the verification data 450 include private certificates assigned by the trusted entity. The trusted entity may include the manufacturer of the administrator computing device 300, the guest computing device 400 or both.

The module is digitally signed by the trusted entity to indicate the module is a verified module authored by the trusted entity and to permit detection of any unwanted modifications to the instructions comprising the module. The module can be stored in the memory 340 of the administrator computing device 300 and in the memory 440 of the guest computing device 400 for execution on their respective processors 330, 430.

When stored in the memories 340, 440 of the administrator computing device 300 and the guest computing device 400, one method of operation of the above embodiment comprises the following actions.

The administrator computing device 300 obtains a pass code, generates a security code 360 including a cryptographic hash including the pass code, a time stamp and the certification data 350 and outputs the security code 360 on a screen of the administrator computing device 300.

The guest computing device obtains the security code 360 by capturing an image containing the security code 360 with a camera or by entering the security code 360 as a string of characters on an appropriate input mechanism 420.

The guest computing device 400 verifies the security code 360 is a cryptographic hash in accordance with the certification data 350 of the module stored in the memory of the guest computing device 400 thereby verifying that the security code 360 was generated by the module authored by the trusted entity.

The guest computing device 400 generates a verification code 460 as a cryptographic hash of some of the security code 360 and some of the verification data 450 and generates a list of device capabilities 480 in accordance with configuration data 470 on the guest computing device 400 such as IT policies data on the guest computing device 400.

The guest computing device 400 outputs, possibly at the same time, the verification code 460 and the list of device capabilities 480 on a screen of the guest computing device 400.

The administrator computing device 300 obtains the verification code 460 by capturing an image containing the verification code 460 with a camera on the administrator computing device or by entering the verification code as a string of characters on an appropriate input mechanism 320.

The administrator computing device 400 verifies the verification code 460 comprises a cryptographic hash in accordance with some of the security code 360 and some of the verification data 450 of the module stored in the memory of the administrator computing device 300 thereby verifying that the verification code 460 was generated by the module authored by the trusted entity, verifying that the verification code 460 was generated in response to the security code 360 and verifying that the list of device capabilities output by the guest computing device 300 are authentic.

Figure 7:
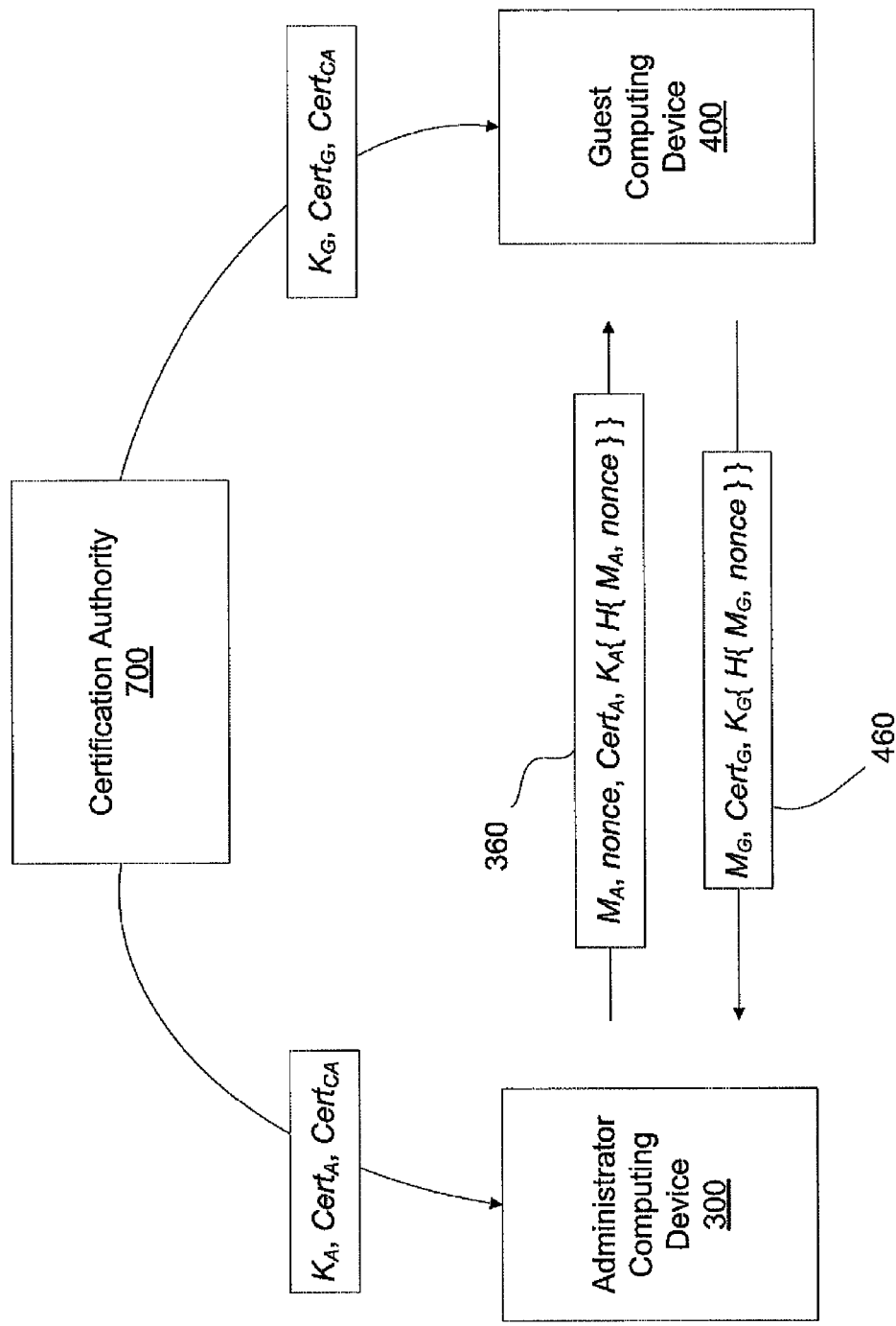
FIG. 7 is a block diagram illustrating a further example embodiment of a system of the present disclosure.

Turning now to FIG. 7, an example embodiment of the present disclosure is partially illustrated including a trusted certification authority 700 that issues certification data. The trusted certification authority comprises any trusted entity that issues certificates including, for non-limiting example, a certificate authority provider, a certification provider server or a device manufacturer operating as a certification authority.

The trusted certification authority 700 issues the administrator computing device 300 a private certificate ($K_A$) and a public certificate ($Cert_A$) to uniquely identify the administrator computing device 300 and issues the guest computing device 400 a private certificate ($K_G$) and a public certificate (Cert$_G$) to uniquely identify the guest computing device 400. The trusted certification authority 700 may also provide a copy of its own public certificate (Cert$_{CA}$).

The certification data 350 comprises the administrator computing device's private certificate ($K_A$), its public certificate (Cert$_A$) and the public certificate of the certification authority (Cert$_{CA}$). Similarly, the verification data 450 comprises the guest computing device's private certificate ($K_G$), its public certificate (Cert$_G$) and the pubic certificate of the certification authority (Cert$_{CA}$). Any of the public certificates may be stored in the memories 340, 440 of either computing devices 300, 400, such as in a trusted key store.

The security code 360 generated by the administrator computing device 300 comprises data forming a message from the administrator computing device ($M_A$), a nonce, the administrator computing device's public certificate (Cert$_A$) and a signed hash of the administrator computing device's message and the nonce ($K_A\{H\{M_A, nonce\}\}$). The hash is signed using the administrator computing device's private key ($K_A$).

The message ($M_A$) comprises information identifying that the purpose of the security code 360 is to verify the administrator device and request a list of device capabilities and authentication information of the guest computing device.

The nonce is generated by the administrator computing device 300 and included in the security code 360 to uniquely identify the transaction the administrator computing device 300 is commencing. The nonce may, for non-limiting example, comprise a pass code, a random number or a time stamp.

The administrator computing device 300 outputs the security code 360 and it is obtained by the guest computing device 400.

The guest computing device 400 extracts from the security code 360 the message from the administrator computing device ($M_A$), the nonce, the administrator computing device's public certificate (Cert$_A$) and the signed hash ($K_A\{H\{M_A, nonce\}\}$). This may include verifying the structure of the data contained in the security code 360.

To verify the security code 360, the guest computing device 400 verifies the administrator computing device's public certificate (Cert$_A$) in the security code 360 with the trusted certification authority 700. If the public certificate was successfully verified, the guest computing device extracts the hash from the signed hash using the administrator computing device's public certificate (Cert$_A\{K_A\{H\{M_A, nonce\}\}\}$) and generates a hash of the administrator computing device's message and the nonce ($H\{M_A, nonce\}$). The guest computing device 400 verifies the extracted hash (Cert$_A\{K_A\{H\{M_A, nonce\}\}\}$) against the generated hash ($H\{M_A, nonce\}$) to verify that the security code 360 was generated by the administrator computing device 300.

If the security code 360 has been verified by the guest computing device 400, the guest computing device 400 generates a list of device capabilities 480 and a verification code 460.

The verification code 460 comprises data forming a message from the guest computing device ($M_G$), the public certificate of the guest computing device (Cert$_G$), and a signed hash of the message from the guest computing device and the nonce extracted from the security code 360 ($K_G\{H\{M_G, nonce\}\}$). The hash is signed using the guest computing device's private key ($K_G$).

The message ($M_G$) comprises information identifying that the purpose of the verification code 460 is to verify the guest computing device to thereby authenticate the list of device capabilities in response to the security code 360.

The guest computing device 400 outputs the verification code 460 and the list of device capabilities 480. The verification code 460 is obtained by the administrator computing device 300.

The administrator computing device 300 extracts from the verification code 460 the message from the guest computing device ($M_G$), the guest computing device's public certificate (Cert$_G$) and the signed hash ($K_G\{H\{M_G, nonce\}\}$). This may include verifying the structure of the data contained in the security code 460.

To verify the verification code 460, the administrator computing device 300 verifies the guest computing device's public certificate (Cert$_G$) in the verification code 460 with the trusted certification authority 700. If the public certificate was successfully verified, the administrator computing device extracts the hash (Cert$_G\{K_G\{H\{M_G, nonce\}\}\}$) from the signed hash using the guest computing device's public certificate and generates a hash of the guest computing device's message and the nonce the administrator computing device used to generate the security code 360 ($H\{M_G, nonce\}$). The administrator computing device 400 verifies the extracted hash (Cert$_G\{K_G\{H\{M_G, nonce\}\}\}$) against the generated hash ($H\{M_G, nonce\}$) to verify that the verification code 460 was generated by the guest computing device 400. If the security code 460 has been verified, then the administrator computing device 400 can trust that the list of device capabilities 480 output by the guest computing device in association with the verification code 460 is an authentic representation of the device capabilities of the guest computing device 400.

It will be apparent to those having ordinary skill in the art that certain adaptations and modifications of the described embodiments can be made, consistent with and without departing from the present disclosure. Unless otherwise indicated, the embodiments described in the disclosure shall be understood to be non-exclusive of each other such that any embodiment can include different features of other embodiments. Therefore, the above discussed embodiments are considered to be illustrative and not restrictive. Other embodiments consistent with the present disclosure will become apparent from consideration of the specification and the practice of the present disclosure taught and suggested herein. Accordingly, the specification and the embodiments disclosed therein are to be considered exemplary only, with the true scope and spirit of the present disclosure being identified in the following claims.

The invention claimed is:

1. A first computing device comprising:
   an input mechanism;
   an output mechanism;
   a memory having configuration data, verification data and non-transitory computer readable instructions stored thereon, the instructions being for:
   obtaining a security code associated with a second computing device from the input mechanism;
   generating a list of device capabilities from the configuration data;
   generating a verification code in accordance with the security code and the verification data, wherein the verification code comprises a cryptographic hash of some of the security code and the security code comprises a cryptographic hash of certification data; and
   outputting the list of device capabilities and the verification code through the output mechanism; and
   a processor connected to the memory for executing the instructions.

2. The first computing device of claim 1 wherein the list of device capabilities comprises a list of hardware capabilities of the guest first computing device.

3. The first computing device of claim 1 wherein at least one of the security code or the verification code is contained in an image.

4. The first computing device of claim 1 wherein the instructions for outputting the list of device capabilities and the verification code through the output mechanism comprise instructions for using the verification code to alter the outputting of the list of device capabilities to the output mechanism.

5. The first computing device of claim 4 wherein the instructions for using the verification code to alter the output of the list of device capabilities to the output mechanism comprises instructions for:
generating a watermarked list of device capabilities including a watermark generated using the verification code, and
outputting the watermarked list of device capabilities.

6. The first computing device of claim 1 wherein the memory comprises further instructions for verifying that the security code is associated with a device authorized to obtain at least some of the capabilities from the configuration data.

7. A first computing device comprising:
an input mechanism;
an output mechanism;
a memory having certification data and non-transitory computer readable instructions stored thereon, the instructions being for:
generating a security code in accordance with the certification data;
outputting the security code through the output mechanism;
obtaining a verification code associated with a second computing device from the input mechanism, wherein the verification code comprises a cryptographic hash of some of the security code and the security code comprises a cryptographic hash of some of the certification data; and
verifying the verification code in accordance with at least one of the certification data or the security code; and
a processor connected to the memory, for executing the instructions.

8. A method for outputting, from a first computing device, a list of device capabilities to a second computing device, the method comprising:
obtaining a security code associated with the second computing device from an input mechanism;
verifying that the security code is associated with the second computing device;
generating a list of device capabilities, the list including capabilities from configuration data;
generating a verification code in accordance with the security code and verification data, wherein the verification code comprises a cryptographic hash of some of the security code and the security code comprises a cryptographic hash of certification data; and
outputting the list of device capabilities and the verification code through an output mechanism.

9. The method of claim 8 further comprising:
verifying that the second computing device is authorized to obtain at least some of the list device capabilities from the configuration data; and
wherein outputting the list of device capabilities through the output mechanism comprises outputting a portion of the list of device capabilities that the second computing device is authorized to obtain.

10. The method of claim 8 wherein at least some of the verification data is associated with a verified module.

11. The method of claim 8 wherein outputting the list of device capabilities and the verification code through the output mechanism comprises using the verification code to alter the outputting of the list of device capabilities to the output mechanism.

12. The method of claim 11 wherein using the verification code to alter the output of the list of device capabilities to the output mechanism further comprises:
generating a watermarked list of device capabilities including a watermark generated using the verification code, and
outputting the watermarked list of device capabilities.

13. The method of claim 8 wherein obtaining a security code through an input mechanism comprises capturing an image containing the security code through a camera.

14. The method of claim 8 wherein verifying that the security code is associated with the second computing device comprises:
verifying that the security code was generated in accordance with certification data associated with the second computing device.

15. A method for verifying a verification code of a first computing device, the method comprising:
generating a security code in accordance with certification data;
outputting the security code through an output mechanism;
obtaining a verification code associated with a second computing device through an input mechanism; and
verifying the verification code is in accordance with at least one of verification data, the security code or the certification data, wherein the verification code comprises a cryptographic hash of some of the security code and the security code comprises a cryptographic hash of some of the certification data.

16. The method of claim 15 wherein generating the security code in accordance with the certification data further comprises:
obtaining a pass code; and
generating the security code in accordance with the certification data and the pass code.

17. The method of claim 15 wherein at least some of the verification data is associated with a verified module associated with the second computing device.

18. The method of claim 15 wherein obtaining the verification code associated with the second computing device from the input mechanism comprises capturing an image containing the verification code through a camera.

19. A first computing device comprising:
an input mechanism;
an output mechanism;
a memory having configuration data, verification data and non-transitory computer readable instructions stored thereon, the instructions being for:
obtaining a security code associated with a second computing device from the input mechanism;
generating a list of device capabilities from the configuration data;
generating a verification code in accordance with the security code and the verification data; and
outputting the list of device capabilities and the verification code through the output mechanism;
wherein the instructions for outputting the list of device capabilities and the verification code through the output mechanism comprise instructions for using the verification code to alter the outputting of the list of device capabilities to the output mechanism;

wherein the instructions for using the verification code to alter the output of the list of device capabilities to the output mechanism comprises instructions for generating a watermarked list of device capabilities including a watermark generated using the verification code, and outputting the watermarked list of device capabilities; and a processor connected to the memory for executing the instructions.

20. The first computing device of claim 19 wherein the list of device capabilities comprises a list of hardware capabilities of the first computing device.

21. The first computing device of claim 19 wherein at least one of the security code or the verification code is contained in an image.

22. The first computing device of claim 19 wherein the memory comprises further instructions for verifying that the security code is associated with a device authorized to obtain at least some of the capabilities from the configuration data.

23. A method for outputting a list of device capabilities from a first computing device to a second computing device, the method comprising:

obtaining a security code associated with the second computing device from an input mechanism;

verifying that the security code is associated with the second computing device;

generating a list of device capabilities, the list including capabilities from configuration data;

generating a verification code in accordance with the security code and verification data; and outputting the list of device capabilities and the verification code through an output mechanism;

wherein outputting the list of device capabilities and the verification code through the output mechanism comprises using the verification code to alter the outputting of the list of device capabilities to the output mechanism; and wherein using the verification code to alter the output of the list of device capabilities to the output mechanism further comprises generating a watermarked list of device capabilities including a watermark generated using the verification code, and outputting the watermarked list of device capabilities.

24. The method of claim 23 further comprising:

verifying that the second computing device is authorized to obtain at least some of the list device capabilities from the configuration data; and wherein outputting the list of device capabilities through the output mechanism comprises outputting a portion of the list of device capabilities that the second computing device is authorized to obtain.

25. The method of claim 23 wherein at least some of the verification data is associated with a verified module.

26. The method of claim 23 wherein obtaining a security code through an input mechanism comprises capturing an image containing the security code through a camera.

27. The method of claim 23 wherein verifying that the security code is associated with the second computing device comprises:

verifying that the security code was generated in accordance with certification data associated with the second computing device.

28. A non-transitory computer-readable storage medium comprising instructions, which when executed by a processor of a first computing device, configure the processor to:

obtain a security code associated with a second computing device from an input mechanism; verify that the security code is associated with the second computing device; generate a list of device capabilities, the list including capabilities from configuration data; generate a verification code in accordance with the security code and verification data, wherein the verification code comprises a cryptographic hash of some of the security code and the security code comprises a cryptographic hash of certification data; and output the list of device capabilities and the verification code through an output mechanism.

29. A non-transitory computer-readable storage medium comprising instructions, which when executed by a processor of a first computing device, configure the processor to:

obtain a security code associated with a second computing device from an input mechanism; verify that the security code is associated with the second computing device; generate a list of device capabilities, the list including capabilities from configuration data; generate a verification code in accordance with the security code and verification data; and output the list of device capabilities and the verification code through an output mechanism; wherein the processor is configured to output the list of device capabilities and the verification code through the output mechanism by using the verification code to alter the outputting of the list of device capabilities to the output mechanism; and wherein the processor is configured to use the verification code to alter the output of the list of device capabilities to the output mechanism by generating a watermarked list of device capabilities including a watermark generated using the verification code, and outputting the watermarked list of device capabilities.

30. A non-transitory computer-readable storage medium comprising instructions, which when executed by a processor of a first computing device, configure the processor to:

generate a security code in accordance with certification data; output the security code through an output mechanism; obtain a verification code associated with a second computing device through an input mechanism; and verify the verification code is in accordance with at least one of verification data, the security code or the certification data, wherein the verification code comprises a cryptographic hash of some of the security code and the security code comprises a cryptographic hash of some of the certification data.

* * * * *